US009913026B2

(12) United States Patent
Ahgren et al.

(10) Patent No.: US 9,913,026 B2
(45) Date of Patent: Mar. 6, 2018

(54) REVERSED ECHO CANCELLER

(71) Applicant: Microsoft Technology Licensing, LLC, Redmond, WA (US)

(72) Inventors: Per Ahgren, Knivsta (SE); Karsten V. Sørensen, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 14/498,972

(22) Filed: Sep. 26, 2014

(65) Prior Publication Data

US 2016/0050491 A1 Feb. 18, 2016

(30) Foreign Application Priority Data

Aug. 13, 2014 (GB) .................................. 1414352.3

(51) Int. Cl.
*H04B 3/20* (2006.01)
*H04R 3/00* (2006.01)
(Continued)

(52) U.S. Cl.
CPC ............... *H04R 3/002* (2013.01); *H04B 3/23* (2013.01); *H04L 65/403* (2013.01); *H04L 65/80* (2013.01); *H04M 9/082* (2013.01); *H04R 1/08* (2013.01)

(58) Field of Classification Search
CPC . H04R 3/002; H04R 1/08; H04R 3/02; H04R 3/005; H04R 2499/11; H04R 2499/13; H04R 2499/15; H04R 2430/03; H04R 1/1083; H04R 1/1091; H04R 1/406; H04B 3/23; H04B 3/20; H04B 3/234; H04B 3/235; H04L 65/403; H04L 65/80;
(Continued)

(56) References Cited

U.S. PATENT DOCUMENTS 6,125,179 A 9/2000 Wu
6,282,286 B1 8/2001 Reesor et al.
(Continued)

FOREIGN PATENT DOCUMENTS

CN 101345787 1/2009
JP 2004274681 9/2004

OTHER PUBLICATIONS

IPCOM'643D, "Managing Multiple Audio Streams in a Single Room", ip.com, Ip.com No. IPCOM000212643D, Nov. 21, 2011, pp. 1-4.*

(Continued)

*Primary Examiner* — Leshui Zhang
(74) *Attorney, Agent, or Firm* — Schwegman Lundberg & Woessner, P.A.

(57) ABSTRACT

A method implemented during a communication event conducted between a user device and at least one further user device over a communications network, the method comprising: receiving an audio signal that is to be output from a speaker of said user device, said audio signal comprising at least one microphone signal transmitted from the at least one further user device; detecting that said audio signal comprises at least one audio component of a microphone signal transmitted from one or more of one of said at least one further user device that is co-located with said user device; and based on this detection, removing said at least one audio component from said audio signal to produce an output audio signal for output from said speaker.

20 Claims, 7 Drawing Sheets

(51) Int. Cl.
*H04R 1/08* (2006.01)
*H04L 29/06* (2006.01)
*H04M 9/08* (2006.01)
*H04B 3/23* (2006.01)

(58) Field of Classification Search
CPC ........ H04M 9/082; H04M 9/08; H04M 3/002;
H04M 3/568; H04M 1/72591; G10L
2021/02082; G10L 2021/02166; G10L
2021/02165; G10L 21/0208; G10L 21/02;
G10L 21/0216; G10L 21/0232; G10L
19/012; G10L 19/00; G10L 15/20; G10K
11/16; G10K 11/175; G10K 11/178;
G10K 2210/505; G10K 2210/1081; G10K
11/002; G10K 11/346; G10K 2210/108;
G10K 2210/111; G10K 2210/117; G10K
2210/12; G10K 2210/123; G10K
2210/301; G10K 2210/3045; G10K
2210/3046; G10K 2210/3219; H03G
3/20; H03G 5/165; H03G 9/025; H03F
2200/03; H04N 2007/145; H04N
2007/17372; H04N 2007/17381; H04N
2007/1739; H04N 2007/243; H04N
2007/246
USPC ......... 381/17, 18, 19, 20, 21, 300, 301, 302,
381/303, 307, 119, 66, 27, 71.1–71.6,
381/71.9, 71.11, 71.12, 26, 318, 86, 92,
381/94.1, 93, 95, 96, 1, 22, 123;
379/406.01–406.16, 157, 158, 201.01,
379/202.01, 93.21, 205.01; 455/416,
455/569.1, 570; 709/204; 700/94

See application file for complete search history.

(56) References Cited

U.S. PATENT DOCUMENTS

| | | | | |
|---|---|---|---|---|
| 6,317,419 | B1 * | 11/2001 | Olafsson | H04B 3/23 370/286 |
| 6,961,422 | B2 | 11/2005 | Boland | |
| 8,081,753 | B2 | 12/2011 | Mohammad et al. | |
| 8,155,302 | B2 | 4/2012 | Roovers | |
| 8,275,120 | B2 | 9/2012 | Stokes, III et al. | |
| 8,325,909 | B2 | 12/2012 | Tashev et al. | |
| 8,526,587 | B2 | 9/2013 | Uhler et al. | |
| 9,591,123 | B2 | 3/2017 | Sorensen et al. | |
| 2002/0076037 | A1 | 6/2002 | Nishimura | |
| 2003/0039353 | A1 * | 2/2003 | Matsuo | H04M 9/082 379/406.01 |
| 2005/0008143 | A1 | 1/2005 | Lang et al. | |
| 2006/0140392 | A1 * | 6/2006 | Ahmadi | H04B 3/23 379/406.1 |
| 2007/0021958 | A1 | 1/2007 | Visser et al. | |
| 2007/0124526 | A1 | 5/2007 | Sinai | |
| 2007/0263851 | A1 | 11/2007 | Sukkar et al. | |
| 2007/0291918 | A1 * | 12/2007 | Diethorn | H04M 3/56 379/202.01 |
| 2008/0267420 | A1 | 10/2008 | Fozunbal | |
| 2009/0003586 | A1 | 1/2009 | Lai et al. | |
| 2009/0185515 | A1 | 7/2009 | Sorensen et al. | |
| 2012/0099732 | A1 * | 4/2012 | Visser | G10L 21/0272 381/17 |
| 2012/0243676 | A1 | 9/2012 | Beaucoup | |
| 2013/0003960 | A1 | 1/2013 | Sollenberger et al. | |
| 2013/0039504 | A1 | 2/2013 | Pandey et al. | |
| 2013/0163748 | A1 | 6/2013 | Khanduri et al. | |
| 2013/0322639 | A1 | 12/2013 | Cleve | |
| 2014/0009564 | A1 | 1/2014 | Cleve et al. | |
| 2014/0355752 | A1 | 12/2014 | Sorensen et al. | |
| 2015/0201087 | A1 * | 7/2015 | Volcker | H04M 9/082 379/202.01 |

OTHER PUBLICATIONS

"International Search Report and Written Opinion Issued in PCT Application No. PCT/US2015/044544", dated Nov. 2, 2015, 10 Pages.
"Managing Multiple Audio Streams in a Single Room", In Journal of Ip. Com Inc., Nov. 21, 2011, 4 Pages.
"International Preliminary Report on Patentability Issued in PCT Application No. PCT/US2014/039469" dated Sep. 9, 2015, 6 Pates.
"Non-Final Office Action", U.S. Appl. No. 14/173,622, dated Dec. 31, 2015, 19 pages.
"Loopback Recording (Windows)", Retrieved from: <http://msdn.microsoft.com/en-us/library/windows/desktop/dd316551(v=vs.85).aspx> Mar. 4, 2013, Nov. 12, 2012, 3 Pages.
"Second Written Opinion", Application No. PCT/US2014/039649, dated May 6, 2015, 4 pages.
"International Search Report and Written Opinion", Application No. PCT/US2014/039649, dated Sep. 2, 2014, 9 pages.
"The Importance of Acoustic Echo Cancellation for Audio Conferencing", Available at: <http://www.avispl.com/wp-content/uploads/2012/12/The-Importance-of-Acoustic-Echo-Cancellation-for-Audio-Conferencing1.pdf>, Jan. 30, 2013, 1 page.
"How to Choose an Acoustic Echo Canceller", Available at: <http://support.polycom.com/global/documents/support/technical/products/voice/vortex_choose_acoustic_echo_canceller.pdf>, Sep. 2004, 13 pages.
"The Importance of Acoustic Echo Cancellation—Part 1", Retrieved From: <http://www.biamp.com/blog/the-importance-of-acoustic-echo-cancellation-part-1/> Jun. 6, 2014, Dec. 13, 2011, 2 pages.
"Second Written Opinion Issued in PCT Application No. PCT/US2015/044544", dated Jul. 22, 2016, 5 Pages.
"Final Office Action Issued in U.S. Appl. No. 14/173,622", dated Jul. 27, 2016, 16 pages.
"International Preliminary Report on Patentability", Application No. PCT/US2015/044544, dated Nov. 9, 2016, 7 pages.
"Notice of Allowance", U.S. Appl. No. 14/173,622, dated Nov. 4, 2016, 7 pages.
"Supplemental Notice of Allowance", U.S. Appl. No. 14/173,622, dated Nov. 17, 2016, 2 pages.
"Foreign Office Action", CN Application No. 201480031339.6, dated Jul. 3, 2017, 14 pages.
"Foreign Office Action", EP Application No. 14736085.3, dated May 8, 2017, 4 pages.
"Supplemental Notice of Allowance", U.S. Appl. No. 14/173,622, dated Feb. 10, 2017, 3 pages.

* cited by examiner

REVERSED ECHO CANCELLER

RELATED APPLICATIONS

This application claims priority under 35 USC § 119 or § 365 to Great Britain Patent Application No. 1414352.3, filed Aug. 13, 2014, the disclosure of which is incorporate in its entirety.

BACKGROUND

Packet-based communication systems allow the user of a device, such as a personal computer, to communicate across a communications network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Packet-based communication systems allow multiple participants to participate in a conference voice or video call. Participants of the conference call that are located in the same acoustic space (i.e. in the same room) may choose to use a single microphone (to receive audio) and speakers (to output audio). However some participants of the conference call that are located in the same acoustic space as other participants may wish to use their own device (with associated microphone and speakers) thus multiple microphones may be present in the acoustic space in which multiple participants of the conference call are present.

When microphone signals originating from the client devices in the same room are propagated over a communications network to the client devices in the same room and played out by their loudspeakers, since the communications network and local audio buffering in the client devices introduce a delay in the signalled audio, the sound will be perceived as an echo by the conference participants located in the same room.

SUMMARY

According to one aspect of the present disclosure there is provided a method implemented during a communication event conducted between a user device and at least one further user device over a communications network, the method comprising: receiving an audio signal that is to be output from a speaker of said user device, said audio signal comprising at least one microphone signal transmitted from one or more of the at least one further user device; detecting that said audio signal comprises at least one audio component of a microphone signal transmitted from one of said at least one further user device that is co-located with said user device; and based on this detection, removing said at least one audio component from said audio signal to produce an output audio signal for output from said speaker.

According to another aspect of the present disclosure there is provided a user device comprising: a network interface configured to transmit and receive audio between the user device and at least one further user device over a communication network during a communication event; a microphone for receiving audio signals; a speaker for outputting audio signals; and one or more processors configured to run a client application, wherein the client application is configured to: receive an audio signal that is to be output from said speaker, said audio signal comprising at least one microphone signal transmitted from one or more of the at least one further user device; detect that said audio signal comprises at least one audio component of a microphone signal transmitted from one of said at least one further user device that is co-located with said user device; and based on this detection, remove said at least one audio component from said audio signal to produce an output audio signal for output from said speaker.

According to another aspect of the present disclosure there is provided a network entity comprising: a network interface configured to transmit and receive audio between a user device and at least one further user device over a communication network during a communication event; and an echo removal module configured to:
receive an audio signal that is to be output from a speaker of said user device said audio signal comprising at least one microphone signal transmitted from one or more of the at least one further user device; detect that said audio signal comprises at least one audio component of a microphone signal transmitted from one of said at least one further user device that is co-located with said user device; and based on this detection, remove said at least one audio component from said audio signal to produce an output audio signal for output from said speaker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure apply to the scenario in which multiple participants are located in a common acoustic space (e.g. in the same room) using multiple audio input devices (e.g. microphones) to conduct a conference call (e.g. voice or video call).

Figure 1:
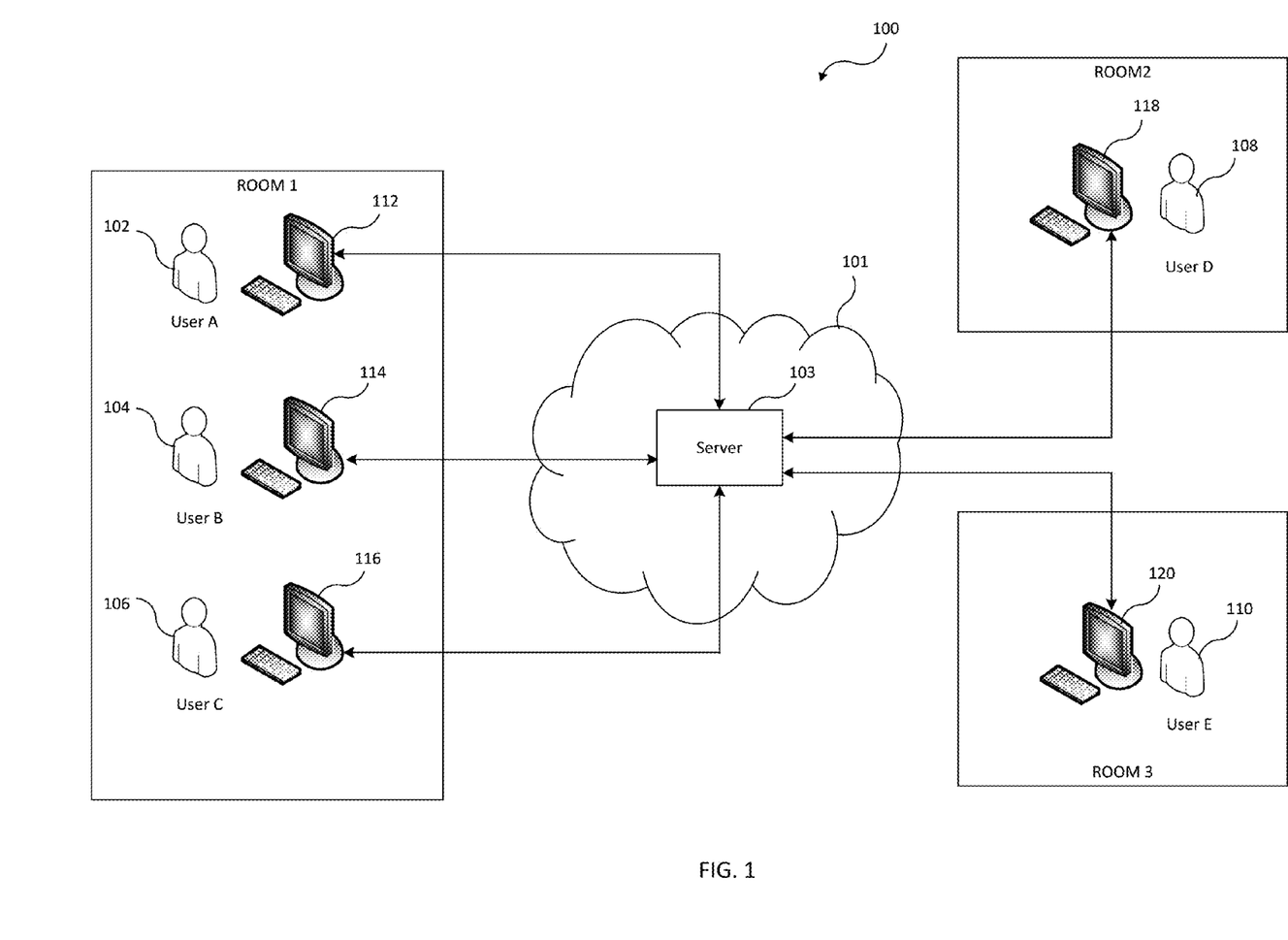
FIG. 1 shows a communication system.

FIG. 1 shows a communication system 100 comprising a first user 102 (User A) who is associated with a user terminal 112, a second user 104 (User B) who is associated with a user terminal 114, a third user 106 (User C) who is associated with a user terminal 116. Users A, B & C and their associated devices are located in the same room ("Room 1").

Whilst three users with associated devices are shown in Room 1, this is merely an example.

The co-located users may communicate with one or more other users (not co-located with the co-located users). FIG. 1 shows a fourth user 108 (User D) who is associated with a user terminal 118 in a room "Room 2", and a fifth user 110 who is associated with a user terminal 120 in a room "Room 3". Whilst FIG. 1 shows user terminals 118 and 120 in an indoor environment, this is merely an example.

The user terminals can communicate over a communication network 101 in the communication system 100, thereby allowing the users to communicate with each other over the communication network 101. The communication network 101 may be any suitable network which has the ability to provide a communication channel between the user terminals. For example, the communication network 101 may be the Internet or another type of network such as a High data rate mobile network, such as a 3rd generation ("3G") mobile network.

Note that in alternative embodiments, user terminals can connect to the communication network 101 via an additional intermediate network not shown in FIG. 1. For example, if a user terminal is a mobile device, then it can connect to the communication network 101 via a cellular mobile network (not shown in FIG. 1), for example a GSM or UMTS network.

The user terminals may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 101.

Each of the user terminals execute a communication client application provided by a software provider associated with the communication system 100. The communication client application is a software program executed on a local processor in the respective user terminal. The communication client application performs the processing required at the respective user terminal in order for the user terminal to transmit and receive data over the communication system 100. The communication client application executed at the user terminal may be authenticated to communicate over the communication system 100 through the presentation of digital certificates (e.g. to prove that the associated user is a genuine subscriber of the communication system—described in more detail in WO 2005/009019).

Many more users and user devices may be included in the communication system 100 and communicate over the communication system 100 using respective communication clients executed on the respective user devices than that shown in FIG. 1, as is known in the art.

FIG. 1 illustrates a server 103 connected to the network 101. During a conference call, audio data may be transmitted via a network entity (e.g. server) 103 between the user terminals. Alternatively or additionally, the audio data of the conference call may be transmitted on point-to-point routes between the user terminals (i.e. a route that does not go via any server in the communication system 100), as is known in the art.

Figure 2:
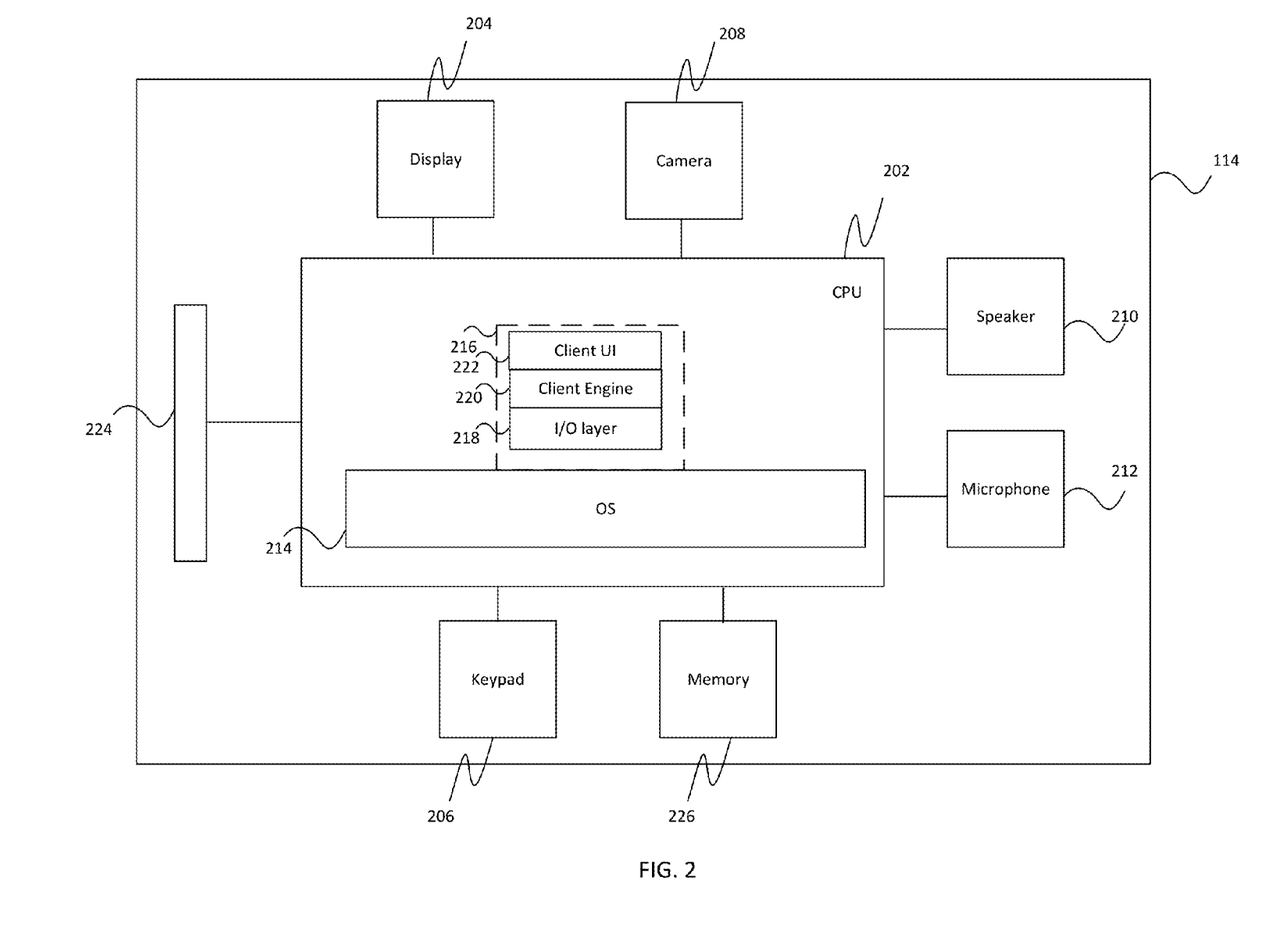
FIG. 2 shows a schematic view of a user terminal.

FIG. 2 illustrates a detailed view of the user terminal 114 on which is executed a communication client application for communicating over the communication system 100. The user terminal 114 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 114 as shown in FIG. 2. In alternative user terminals one or more of the display 204, the keypad 206, the camera 208, the output audio device 210 and the input audio device 212 may not be integrated into the user terminal 114 and may be connected to the CPU 202 via respective interfaces. One example of such an interface is a USB interface. The CPU 202 is connected to a network interface 224 such as a modem for communication with the communication network 101. The network interface 224 may be integrated into the user terminal 114 as shown in FIG. 2. In alternative user terminals the network interface 224 is not integrated into the user terminal 114. The user terminal 114 also comprises a memory 226 for storing data as is known in the art. The memory 226 may be a permanent memory, such as ROM. The memory 226 may alternatively be a temporary memory, such as RAM.

The user terminal 114 is installed with a communication client application in that the communication client application is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 101 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 114 via the user interface of the client which is displayed on the display 204 and to receive information from the user the user terminal 114 via the user interface.

A first echo effect which arises due to conference participants being located in the same room will now be described with reference to FIG. 3.

Figure 3:
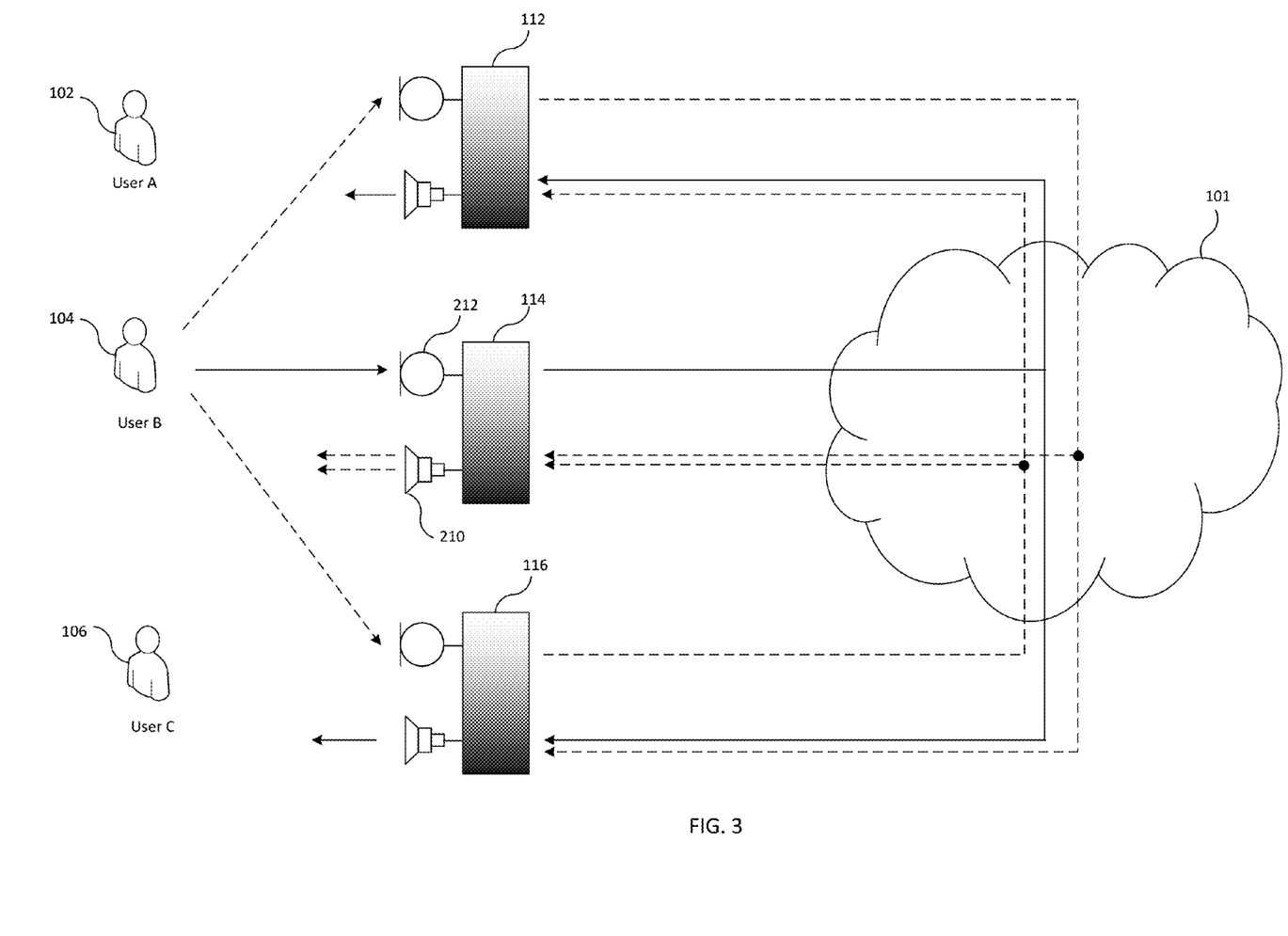
FIG. 3 illustrates how echo arises due to conference participants being located in the same acoustic space.

As shown in FIG. 3, an audio signal received by the microphone 212 of user terminal 114 is transmitted over the network 101 to user terminal 112 for playout by speakers of user terminal 112 and to user terminal 116 for playout by speakers of user terminal 116. Whilst not shown in FIG. 3, it will be appreciated that the audio signal received by the microphone 212 of user terminal 114 is also transmitted over the network 101 to user terminal 118 and user terminal 120 (user terminal 118 and user terminal 120 not shown in FIG. 3).

Due to user terminals 112 and 116 being in the same acoustic space as user terminal 114, the audio signal received by the microphone 212 of user terminal 114 may also be received by the microphone of user terminal 112 (indicated by the dashed line) and transmitted over the network 101 from user terminal 112 to user terminal 114 for playout by speakers of user terminal 114 and to user terminal 116 for playout by speakers of user terminal 116.

Due to user terminals 112 and 116 being in the same acoustic space as user terminal 114, the audio signal received by the microphone 212 of user terminal 114 may also be received by the microphone of user terminal 116 (indicated by the dashed line) and transmitted from user terminal 116 over the network 101 to user terminal 112 for playout by speakers of user terminal 112 and to user terminal 114 for playout by speakers of user terminal 114.

In this scenario, User B 104 will hear an echo of the audio signal input (e.g. User B's speech) into the microphone 212 of user terminal 114. This is caused by the delay that is introduced by the network 101 when the audio signal received by the microphone of user terminal 112 (indicated by the dashed line) is transmitted over the network 101 from user terminal 112 to user terminal 114, and the delay that is introduced by network 101 when the audio signal received by the microphone of user terminal 116 (indicated by the dashed line) is transmitted over the network 101 from user terminal 112 to user terminal 114.

User A 102 will hear the audio signal input (e.g. User B's speech) into the microphone 212 of user terminal 114 due to being in the same room as User B (i.e. sounds waves travelling across Room 1). User A 102 will also hear an echo of the audio signal input (e.g. User B's speech) into the microphone 212 of user terminal 114 due to the delay that is introduced by the network 101 when the audio signal received by the microphone of user terminal 114 (indicated by the solid line) is transmitted over the network 101 from user terminal 114 to user terminal 112 and the speakers of user terminal 112 outputting this audio signal to User A 102. User A 102 will also hear an echo of the audio signal input (e.g. User B's speech) into the microphone 212 of user terminal 114 due to the delay that is introduced by the network 101 when the audio signal received by the microphone of user terminal 116 (indicated by the dashed line) is transmitted over the network 101 from user terminal 116 to user terminal 112 and the speakers of user terminal 112 outputting this audio signal to User A 102.

Similarly, User C 106 will hear the audio signal input (e.g. User B's speech) into the microphone 212 of user terminal 114 due to being in the same room as User B (i.e. sounds waves travelling across Room 1). User C 106 will also hear an echo of the audio signal input (e.g. User B's speech) into the microphone 212 of user terminal 114 due to the delay that is introduced by the network 101 when the audio signal received by the microphone of user terminal 114 (indicated by the solid line) is transmitted over the network 101 from user terminal 114 to user terminal 116 and the speakers of user terminal 116 outputting this audio signal to User C 106. User C 106 will also hear an echo of the audio signal input (e.g. User B's speech) into the microphone 212 of user terminal 114 due to the delay that is introduced by the network 101 when the audio signal received by the microphone of user terminal 112 (indicated by the dashed line) is transmitted over the network 101 from user terminal 112 to user terminal 116 and the speakers of user terminal 116 outputting this audio signal to User C 106.

Figure 4:
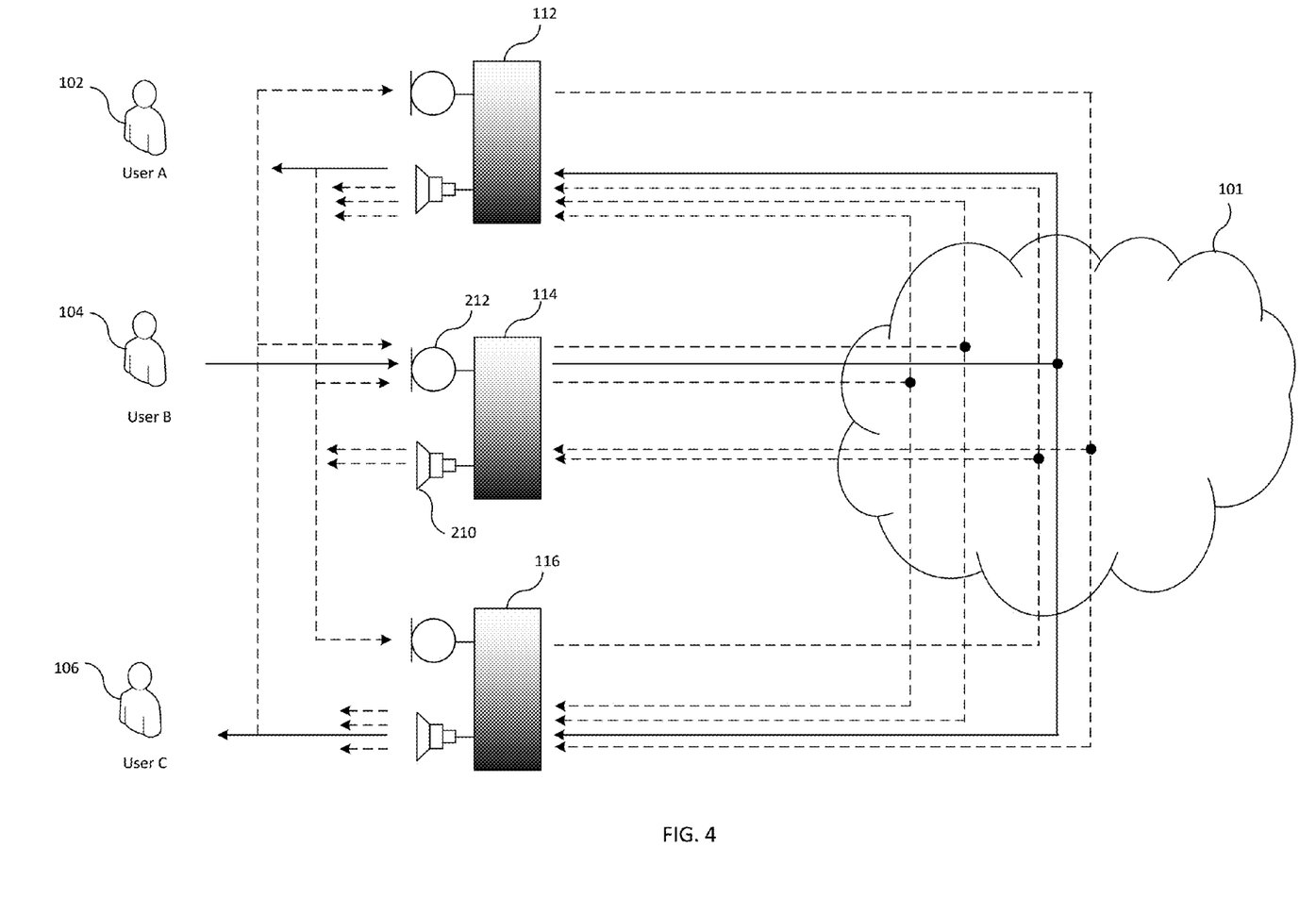
FIG. 4 illustrates how echo arises due to conference participants being located in the same acoustic space.

A second echo effect which arises due to conference participants being located in the same room will now be described with reference to FIG. 4. As shown in FIG. 4 playout of the audio signal received by the microphone 212 of user terminal 114 by speakers of user terminal 112 and by speakers of user terminal 116 may be received by the microphones of other co-located devices.

User B 104 will hear an echo of the audio signal input (e.g. User B's speech) into the microphone 212 of user terminal 114. This is caused by (i) the microphone of user terminal 112 receiving the audio signal (e.g. User B's speech) output from the speakers of user terminal 116 and this audio signal propagating through the network 101 from user terminal 112 to user terminal 114 for playout by speakers of user terminal 114; and (ii) the microphone of user terminal 116 receiving the audio signal (e.g. User B's speech) output from the speakers of user terminal 112 and this audio signal propagating through the network 101 from user terminal 116 to user terminal 114 for playout by speakers of user terminal 114 User A 102 will also hear an echo of the audio signal input (e.g. User B's speech) into the microphone 212 of user terminal 114. This is caused by (i) the microphone of user terminal 116 receiving the audio signal (e.g. User B's speech) output from the speakers of user terminal 112 and this audio signal propagating through the network 101 from user terminal 116 to user terminal 112 for playout by speakers of user terminal 112; (ii) the microphone of user terminal 114 receiving the audio signal (e.g. User B's speech) output from the speakers of user terminal 112 and this audio signal propagating through the network 101 from user terminal 114 to user terminal 112 for playout by speakers of user terminal 112; and (iii) the microphone of user terminal 114 receiving the audio signal (e.g. User B's speech) output from the speakers of user terminal 116 and this audio signal propagating through the network 101 from user terminal 114 to user terminal 112 for playout by speakers of user terminal 112.

User C 106 will also hear an echo of the audio signal input (e.g. User B's speech) into the microphone 212 of user terminal 114. This is caused by (i) the microphone of user terminal 112 receiving the audio signal (e.g. User B's speech) output from the speakers of user terminal 116 and this audio signal propagating through the network 101 from user terminal 112 to user terminal 116 for playout by speakers of user terminal 116; (ii) the microphone of user terminal 114 receiving the audio signal (e.g. User B's speech) output from the speakers of user terminal 112 and this audio signal propagating through the network 101 from user terminal 114 to user terminal 116 for playout by speakers of user terminal 116; and (iii) the microphone of user terminal 114 receiving the audio signal (e.g. User B's speech) output from the speakers of user terminal 116 and this audio signal propagating through the network 101 from user terminal 114 to user terminal 116 for playout by speakers of user terminal 116.

Further undesirable echo effects will arise as this will continue to happen for the same initial speech signal (the audio signal received by the microphone 212 of user terminal 114).

One method to overcome the echo problems presented above would be for the multiple participants that are located in the common acoustic space to mute all microphones but one in the common acoustic space. However this is often undesirable for the co-located conference participants.

Another method is for the multiple participants that are located in the common acoustic space to wear audio headsets. An audio headset is single device that contains both an output audio component (headphones, ear buds, or similar) and an input audio component (microphone) which may be connected to a user terminal participating in the conference call via a suitable interface such as USB or audio jack-based interface. The use of audio headsets by the multiple participants that are located in the common acoustic space prevents the second echo effect described above occurring since playout of audio from the output audio component of one headset will not be received by the input audio component of another headset worn by a co-located user. However the locality of the microphone of an audio headset worn by a conference participant located in the same acoustic space as other conference participants is typically not sufficient to prevent the first echo effect described above from occurring.

Figure 5A:
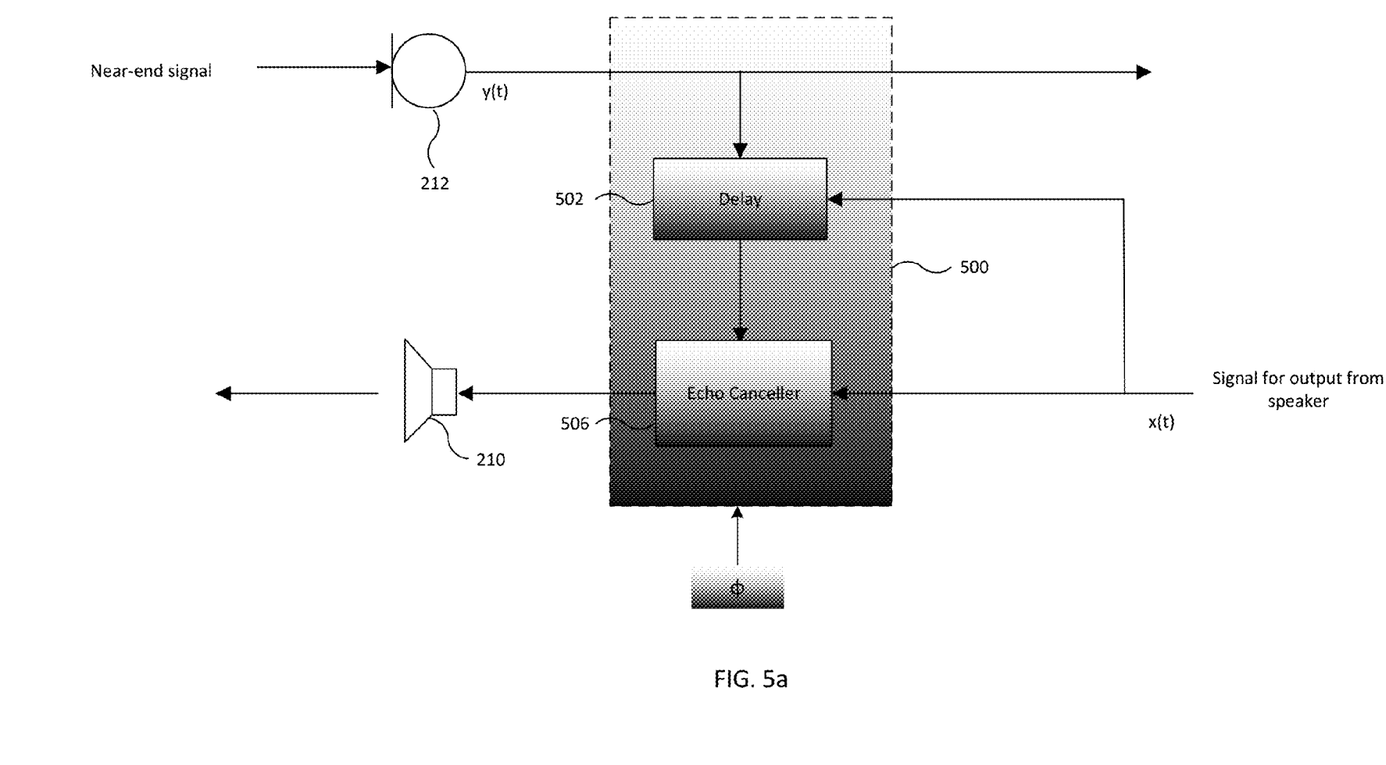
FIG. 5a is a functional diagram showing modules for use in echo removal performed on a user terminal.
Figure 6:
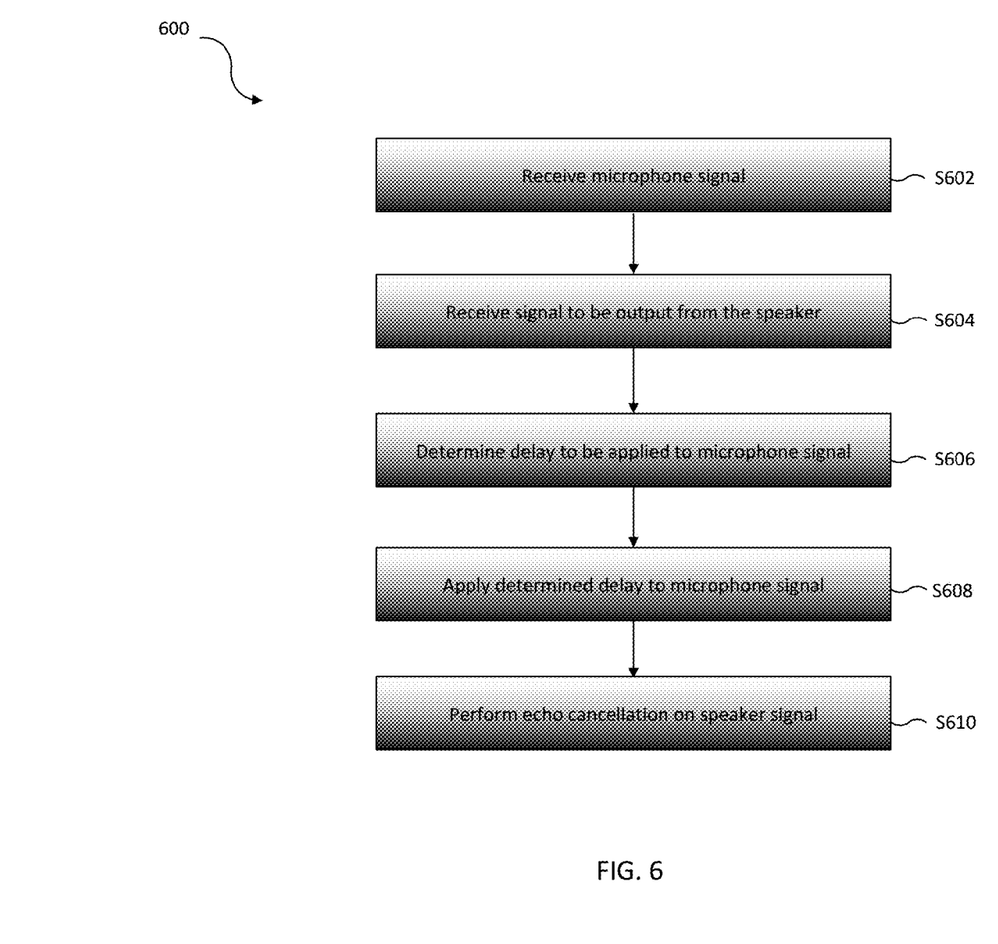
FIG. 6 is a flow chart for a process of removing echo.

With reference to FIGS. 5*a* and 6 there is now described a method of removing echo. FIG. 5*a* is a functional diagram of an echo removal system 500 for removing echo from the signal that is to be output from the speaker 210 of user terminal 114.

FIG. 5*a* illustrates the echo removal system 500 being implemented on user terminal 114 as part of the functionality of the communication client application executed on CPU 202 of user terminal 114; however as will be described in more detail below the echo removal system 500 may also be implemented on server 103.

The echo removal system 500 comprises a delay module 502, and an echo cancellation module 506.

As shown in FIG. 5*a*, a near end signal y(t) captured by the microphone 212 of user terminal 114 is coupled to a first input of the delay module 502. It should be noted that in the embodiments described herein there is just one microphone (indicated by reference numeral 212 in the figures) but in other embodiments there may be more than one microphone which receive audio signals from the surrounding environment. Similarly, in the embodiments described herein there is just one speaker (indicated by reference numeral 210 in the figures) but in other embodiments there may be more than one speaker to which the signal to be outputted is coupled (for outputting therefrom). A signal x(t) to be output from the speaker 210 is coupled to a second input of the delay module 502. An output of the delay module 502 is coupled to a first input of the echo cancellation module 506 The signal x(t) to be output from the speaker 210 is also coupled to a second input of the echo cancellation module 506.

When the echo removal system 500 is implemented as part of the functionality of the communication client application executed on CPU 202 of user terminal 114, the near end signal y(t) captured by the microphone 212 of user terminal 114 is in unencoded form prior to being encoded by an encoder on said user terminal 114, and the signal x(t) to be output from the speaker 210 is in unencoded form following an encoded signal received over the communications network 101 being decoded by a decoder on said user terminal 114.

FIG. 6 is a flow chart for a process 600 of removing echo caused by signal components originating from the near end signal y(t) being present in the signal x(t) to be output from the speaker 210.

At step S602 the near end signal y(t) captured by the microphone 212 of user terminal 114 is received by the echo removal system 500. For example, the near end signal y(t) may be captured by the microphone 212 of user terminal 114 during a voice or video call between the users 102-110 over the communication system 100.

At step S604, the echo removal system 500 receives the signal x(t) to be output from the speaker 210. As described above, both the delay module 502 and the echo cancellation module 506 are arranged to receive the signal x(t) to be output from the speaker 210.

At step S606, the delay module 502 determines a delay to be applied to the near end signal y(t) based on receiving the near end signal y(t) and the signal x(t) as inputs. This delay corresponds to the network delay experienced by the signal components in the signal y(t) in the feedback loop over the network before arriving as an input to the echo removal system 500 as part of a signal x(t) to be output from the speaker 210. Due to changing network conditions the delay module 502 performs adaptive delay estimation. Adaptive delay estimation methods are well known to persons skilled in the art so are therefore not described in detail herein. One method would be to use a cross-correlation technique that compares the near end signal y(t) and the signal x(t) to be output from the speaker 210 at multiple different delays (using the correlation technique) and choosing the delay of highest correlation as the estimate of the network delay.

At step S608, the delay module 502 applies the delay determined at step S606 to the near end signal y(t) before outputting this delayed near end signal y(t) to the echo cancellation module 506.

Based on receiving the delayed near end signal y(t) and signal x(t), at step S610 the echo cancellation module 506 is arranged to remove echo components (which are signal components of microphone signals of conference participants located in the same acoustic space as user terminal 114) from the signal x(t). The echo cancellation module 506 may be based on echo subtraction wherein an estimate of the echo is subtracted from the signal x(t). Alternatively the echo cancellation module 506 may be based on echo suppression wherein echo suppression gains (which will necessarily be less than or equal to 1) are applied to the signal x(t). As such the applied gains will attenuate the power in the signal x(t) to remove the echo. Furthermore the echo cancellation module 506 may be a hybrid echo canceller combining both echo subtraction and echo suppression techniques. Persons skilled in the art will be familiar on the possible ways to implement the echo cancellation module 506 therefore these are not discussed in detail herein.

For completeness a few example techniques that may be implemented by the echo cancellation module 506 to perform step S610 are described briefly below. However persons skilled in the art will appreciate that the echo cancellation module 506 may be implemented in various other ways to those mentioned below.

In one example the echo cancellation module 506 may monitor the cross-correlation between the signal x(t) and the delayed near end signal y(t) output from the delay module 502. As will be appreciated by persons skilled in the art, for a practically feasible cross-correlation based similarity measure, monitoring of the signal levels and adjustment of the averaging of the cross-correlation may be required. This enables the echo cancellation module 506 to determine whether a microphone signal of a conference participant located in the same acoustic space as user terminal 114 is present in the signal x(t) sent to user terminal 114.

In another example, the echo cancellation module 506 may model the system between the near end signal y(t) and the received signal x(t) to provide a prediction of echo components (which are signal components of microphone signals of conference participants located in the same acoustic space as user terminal 114) of the signal x(t) based on the near end signal y(t), and then compare the prediction of the echo components in the signal x(t) to the received signal x(t) to determine similarity between signal components of the delayed near end signal y(t) and the received signal x(t). For example this comparison may be performed in a least-squares manner such that when the squared differences between a component of the actual received signal x(t) and a component of the prediction of the signal x(t) are low, the signal components are deemed similar.

A filter module may be used to model the system between the near end signal y(t) and the received signal x(t) to provide a prediction of the echo components in the signal x(t). The system being modelled comprises all of the system components that signal components of the near end signal y(t) pass through before arriving as part of the signal x(t) e.g. the echo path of the near end signal, for example encoders and decoders, jitter buffers and the network 101. The filter module takes as inputs the received signal x(t) and the delayed near end signal y(t) output from the delay module 502.

The filter module comprises an adaptation algorithm component which executes a adaption control algorithm to identify the coefficients of the filter module that minimises a magnitude, absolute value or squared value of an estimation error signal e(t).

Updated filter coefficients for the filter module are generated in response to the error signal e(t), the delayed near end signal y(t) and the previous filter coefficients.

The adaptation algorithm component of the filter module operates in a time recursive manner. This means it does not instantaneously adapt to changes in the system, instead the algorithm iteratively converges to an approximation of the system between the near end signal y(t) and the received signal x(t) over a finite time interval. Regardless of the particular algorithm used, the filter coefficients of the filter module are updated with each iteration of the algorithm, thus the coefficients of the filter module are continually updated over time regardless of the signal conditions at hand.

The filter coefficients of the filter module are used to filter the delayed near end signal y(t) to generate an estimate (prediction) of the echo components in the signal x(t).

In another variant, the model is used to estimate properties of the echo components in the signal x(t) such as the echo power, and the echo cancellation module 506 is configured to perform echo cancellation based on the echo power estimate of the echo components in the signal x(t). There are many ways to do this that are known to persons skilled in the art and the scope of this disclosure is not limited to any particular method of determining an echo power estimate.

The filter module may utilise any filter implementing a stochastic gradient algorithm. The filer module may utilise a linear filter to model the system between the near end signal y(t) and the received signal x(t) (e.g. a Finite Impulse Response (FIR) filter or an Infinite impulse Response (IIR) filter) or alternatively may utilise a non-linear filter.

The signal components of y(t) may take several different paths (and therefore pass through different system components) before arriving as part of the signal x(t), This can be handled by configuring how the filter module models the system between the near end signal y(t) and the received signal x(t). For linear acoustic echo cancellation, the multiple echoes can be handed by increasing the length of the filter and there are similar approaches that can be utilized for echo suppressors that will be apparent to persons skilled in the art.

It will be appreciated that the echo removal system 500 can be considered a "backwards" or "reversed" echo canceller in that it uses the microphone signal in order to predict, and remove, any parts of the loudspeaker signal that are found to originate from the microphone signal, in contrast to a conventional "forwards" echo canceller that is known in the art which is used to remove the echoes in the microphone signal that are found to originate from the loudspeaker signal.

Whilst the echo removal system 500 has been described above as being implemented as part of the functionality of the communication client application executed on CPU 202 of user terminal 114, the same principles apply when the echo removal system 500 is implemented as part of the functionality of a communication client application executed on any user terminal participating in the conference call.

As described above the echo removal system 500 may be implemented on server 103. One possible way the echo removal system 500 may be implemented on server 103 is show in FIG. 5b.

Figure 5B:
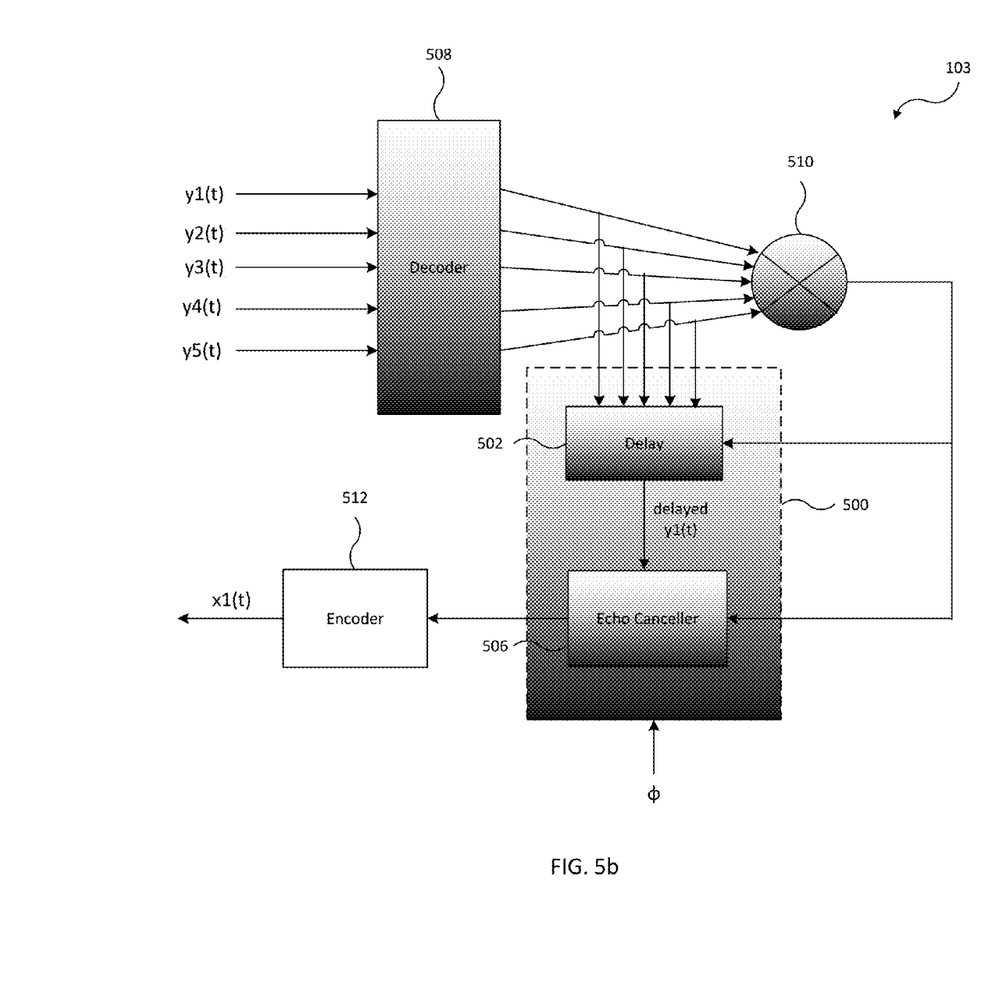
FIG. 5b is a functional diagram showing modules for use in echo removal performed on a server.

As shown in FIG. 5b, when the echo removal system 500 is implemented on the server 103, the near end signals y(t) captured by the microphones of the user terminals participating in a communication event are received over the network 101 by the server 103 in encoded form (having been encoded by encoders on the respective user terminals).

In FIG. 5b, $y1(t)$ is received from user terminal 112, $y2(t)$ is received from user terminal 114, $y3(t)$ is received from user terminal 116, $y4(t)$ is received from user terminal 118, and $y5(t)$ is received from user terminal 120, Typically a server 103 comprises a decoder 508 that decodes the encoded signals $y1(t)$-$y5(t)$ to output respective decoded signals, a mixer 510 that is arranged to receive the decoded signals and combine them into a single stream, and an encoder 512 that encodes the single stream output from the mixer to produce an output signal x(t). Each of the participant user terminals receive their own version of x(t), but some of these signals x(t) can be identical.

As shown in FIG. 5b, the delay module 502 receives the decoded $y1(t)$-$y5(t)$ signals that are input into the mixer 510. For each of the decoded $y1(t)$-$y5(t)$ signals, the delay module 502 computes a delay corresponding to the signal propagation time between the sound source and the server 103 which includes (i) the delay due to the propagation path between the sound source and the user terminal producing the decoded y(t) signal, (ii) the delay due to audio processing at the user terminal producing the decoded y(t) signal, and (iii) the one way network delay between the user terminal producing the decoded y(t) signal and the server 103. The signal propagation time of the decoded $y1(t)$-$y5(t)$ signals may be different amount due to the possibly different delays of the network 101. Due to changing network conditions the delay module 502 performs adaptive delay estimation when the echo removal system 500 is implemented on the server 103.

For simplicity, the implementation of the echo removal system 500 on the server 103 is discussed below with reference to the signal $x1(t)$ that is sent from the server 103 to the user terminal 112 that produced $y1(t)$.

It will be apparent that in the scenario where the user terminal 112 (producing $y1(t)$) is co-located with another user terminal e.g. user terminal 114 producing $y2(t)$, echo will be heard by User A at user terminal 112 due to sound from a single source s(t) being picked up by the microphone of the user terminal 114, this sound being transmitted to the server 103 over the communications network 101 and being present in the signal $x1(t)$ that is transmitted to the user terminal 112.

As described above, the echo cancellation module 506 may implement one of various known techniques to perform the echo cancellation.

In one example technique the decoded signal y1($t$) can be used to provide a prediction of y2($t$) i.e. signal components present in the single stream output of the mixer 510 that would cause echo to be heard by User A at user terminal 112.

In this example, the decoded signal y1($t$) is provided to the delay module 502. Once a delay has been computed and applied to the decoded signal y1($t$) by the delay module 502 (described in more detail below), the delayed y1($t$) signal is supplied to the echo cancellation module 506.

The echo cancellation module 506 also receives as an input, the single stream output of the mixer 510. Based on receiving the delayed signal y1($t$) and the single stream output of the mixer 510, the echo cancellation module 506 is arranged to remove signal components of y2($t$) from the single stream output of the mixer 510 to provide the signal x1($t$) that is to be transmitted from the server 103 to the user terminal 112.

The signal y1($t$) is a function of the sound source as y1($t$)=F1($s(t)$), and the signal y2($t$) is a function of the sound source as y2($t$)=F2($s(t)$).

The function F1 refers to the system components that affect the sound from the single source s(t) before arriving as an input y1($t$) to the decoder 508 of the server 103. This includes (i) the propagation path between the sound source and user terminal 112, (ii) signal processing of the recorded sound at user terminal 112, (iii) the encoding process at user terminal 112, and (iv) the delay of the network 101.

Similarly, the function F2 refers to the system components that affect the sound from the single source s(t) before arriving as an input y2($t$) to the decoder 508 of the server 103. This includes (i) the propagation path between the sound source and user terminal 114, (ii) signal processing of the recorded sound at user terminal 114, (iii) the encoding process at user terminal 114, and (iv) the delay of the network 101.

It will be apparent that y2($t$)=F2F1'y1($t$) (where F1' is the inverse of function F1), thus in order for the signal y1($t$) to be used as a predictor for y2($t$) the echo cancellation module 506 needs to model both F2 and the inverse of F1 (F1').

For instance, assume that F1 and F2 are simple constants such that F1=5 and F2=3; Then y1($t$)=5s(t) and y2($t$)=3s(t) which means that y2($t$)=3/5y1($t$). The situation is similar when F1 and F2 are more advanced than this, e.g. if F1 and F2 are FIR filters, then the relationship between y1 and y2 becomes an IIR filter with a nominator and denominator.

As described above a delay is computed and applied to the decoded signal y1($t$) by the delay module 502. This delay is the delay difference between when a certain component in s(t) appears in y1($t$) and in y2($t$). One method to detect this delay difference would be to use a cross-correlation technique that compares the signal y1($t$) and y2($t$) at multiple different delays (using the correlation technique) and choosing the delay of highest correlation as the delay difference. Another method to detect this delay would be to use the time stamps of the Real-time Transport Protocol (RTP) packets used to transmit the encoded audio data of signals y1($t$) and y2($t$).

If this delay is not compensated for, the model computed for modelling y2($t$) based on y1($t$) may need to be non-causal, i.e., it may need to contain future components of y1($t$) (y1($t$+1), y1($t$+2), . . . ). However, if this delay is identified and compensated for, it can be assumed that the model is causal which simplifies the model parameter estimation.

That is, the purpose of the delay computation performed by the delay module 502 is to align the signals y1($t$) and y2($t$) to allow a casual model for the relationship between y1($t$) and y2($t$) to be used. The delay computed and applied to the signal y1($t$) is therefore the delay difference between y1($t$) and y2($t$), i.e., the difference in the signal propagation times between the sound source and the server 103 for signals y1($t$) and y2($t$).

Whilst the echo cancellation has been described above with reference to y1($t$) being used to provide a prediction of y2($t$), the same principles apply for y1($t$) being used to provide a prediction of audio signals received from other participants in the conference call.

Based on receiving information on which of the user terminals participating in the conference call are located in the same acoustic space (described in more detail below), the above described delay computation and echo cancellation may be simplified by not having to predict signal components of signals that do not originate from a user terminal that is co-located with another user terminal participating in the conference call.

The echo cancellation module 506 may also receive side-information from the mixer 510 indicating which of the decoded y1($t$)-y5($t$) signals have been mixed together to produce the single stream that is output by the mixer 510. By knowing what signals have been mixed together to produce the single stream that is output by the mixer 510, the echo cancellation module 506 can know whether any of the co-located participants' microphone signals are in the stream. This would improve the estimation of the model in the echo cancellation module 506 since the echo cancellation module 506 would not have to avoid estimating the model on data that is not coming from the co-located location. Furthermore, it would allow selectively turning off of the echo removal functionality which would improve the quality of the output of the echo cancellation module 506 since it would reduce the risk of removing false echoes (echoes that are not echoes). For example, if a similar sound is present in both y1($t$) and a non co-located signal that is in the single stream that is output by the mixer 510 the non co-located signal could be affected by the echo removal if the delay of the sound matched any of the delays of the co-located signals.

An alternative to this is to use a signal component identification module (not shown in the figures) which is configured to identify signal components of the signal x(t) that originate from near end signal y(t) based on receiving the signal x(t) and the delayed near end signal y(t) output from the delay module 502. This would avoid the need for the echo cancellation module 506 to perform echo cancellation on the signal x(t) for the scenario when audio input into the microphone producing the near end signal y(t) is not present in the signal x(t) sent from the server 103 to be output from the speaker 210.

Once echo cancellation has been performed the encoder 512 encodes the single stream output from the mixer echo cancellation module 506 to produce an encoded output signal x1($t$) for delivery over the network 101 to the user terminal 112.

Whilst implementation of the echo removal system 500 on server 103 has been described above with reference to the signal x1($t$) that is sent from the server 103 to the user terminal 112 that produced y1($t$), the same principles apply when the server 103 produces an output signal x(t) for delivery over the network 101 to each of the user terminals participating in the conference call.

It would be appreciated by persons skilled in the art that the implementation of the echo removal system 500 on server 103 may be simpler to implement compared to the echo removal system 500 being implemented as part of the functionality of the communication client application executed on CPU 202 of a user terminal.

The system being modelled by the communication client application is nonlinear as it comprises two encoders and decoders, jitter buffers on the server 103 and user terminals and any loss in the network 101. The system being modelled by the communication client application includes a time-variant delay as it includes the round-trip delay of the network and the delays in the jitter buffers on the server and the client.

In contrast, the system being modelled by the server 103 may be more (possibly even fully) linear and have a rather predictable (possibly constant) delay. The simpler the system that is modelled by the echo cancellation module 506, the simpler the task of the echo cancellation module 506 is. For scenarios where the same codec is used by each of the user terminals participating in the conference call, in the server implementation since the echo cancellation module 506 can be applied after the microphone signal has been decoded, and before the loudspeaker signal has been encoded, and since the signal and the echo have been encoded/decoded in the same manner on its way to the server, the model does not need to include the effects of the encoders/decoders present in the system that the echo cancellation module 506 needs to model.

The result is that in the server implementation the delay estimation performed by the delay module 502 and the echo cancellation of signal components of the signal x(t) to be output from the speaker 210 that originate from near end signal y(t) performed by the echo cancellation module 506 may become more accurate and robust.

The functionality of the echo removal system 500 may be constantly activated to prevent the above described problems associated with having participant devices (with associated speaker and microphone) of the conference call being located in the same acoustic space.

In other embodiments, the functionality of the echo removal system 500 may be activated only when a user terminal participating in the conference call is located close to another user terminal participating in the conference call (e.g. in the same acoustic space), thus when there are no user terminals participating in the conference call that are co-located the functionality of the echo removal system 500 is de-activated. FIGS. 5a and 5b illustrate an input φ used to activate/deactivate the operation of the echo removal system 500.

When the echo removal system 500 is implemented as part of the functionality of a communication client application executed on CPU 202 of a user terminal there are various ways that the communication client application can detect that the user terminal on which it is executed is co-located with another user terminal participating in the conference call, these are described below.

In one example, a communication client application can detect that the user terminal on which it is executed is co-located with another user terminal participating in the conference call based on detecting a manual notification by the user of the user terminal by detecting an interaction with the client user interface provided by the communication client application (e.g. selection of a button to indicate that the user terminal is co-located with another user terminal). Similar principles apply when the echo removal system 500 is implemented as part of the functionality of the server 103 based on each of the communication client applications executed on user terminals participating in the conference call being arranged to communicate the detected interaction to the server 103.

In another example, a communication client application can detect that the user terminal on which it is executed is co-located with another user terminal participating in the conference call based on the communication client application determining the location of the user terminal on which it is executed and receiving location information from another terminal participating in the conference call. Each communication client application may determine the location of the user terminal on which it is executed and report their location by transmitting location information (i.e. latitude and longitude information) to the other communication client applications executed on the other user terminals participating in the conference call. A communication client application may determine the location of the user terminal on which it is executed by communicating with a location determination module running on top of the OS 214. The location determination module uses geographic location technology for determining the location of the user terminal, in terms of geographic position relative to the surface of the earth; for example, a satellite based positioning system such as GPS (Global Positioning System, including potential variants such as assisted GPS or differential GPS), GLO-NASS (Global Navigation Satellite System) or Galileo. Thus a communication client application has location information of the user terminal on which it is executed as well as location information of the other user terminals participating in the conference call, and can detect whether the user terminal on which it is executed is co-located with another user terminal participating in the conference call based on whether the other user terminal is within a predetermined range of the user terminal Similar principles apply when the echo removal system 500 is implemented as part of the functionality of the server 103 based on each of the communication client applications executed on user terminals participating in the conference call being arranged to communicate the location of the user terminal on which it is executed to the server 103.

In another example, each communication client application may determine an identifier of an access point used by the user terminal to access the communication network 101 and report this access point identifier to the other communication client applications executed on the other user terminals participating in the conference call. Thus a communication client application has the access point identifier of the user terminal on which it is executed as well as the access points identifiers received from other user terminals participating in the conference call. Therefore a communication client application can detect that the user terminal on which it is executed is co-located with another user terminal participating in the conference call based on whether the access point identifier used by the user terminal to access the communication network 101 matches an access point identifier received from another user terminal participating in the conference call. Similar principles apply when the echo removal system 500 is implemented as part of the functionality of the server 103 based on each of the communication client applications executed on user terminals participating in the conference call being arranged to communicate the identifier of an access point used by the user terminal on which it is executed on to access the communication network 101, to the server 103

In another example, each communication client application may obtain device identification information of user terminals within range of the user terminal on which it is executed on using a short range wireless technology such as Bluetooth® or Near-Field Communication (NFC) and report this obtained device identification information to the other communication client applications executed on the other user terminals participating in the conference call.

Thus a communication client application having device identification of the other user terminals participating in the conference call can detect whether the user terminal on which it is executed is co-located with another user terminal participating in the conference call based on whether the other user terminal is within range of the user terminal. Similar principles apply when the echo removal system 500 is implemented as part of the functionality of the server 103 based on each of the communication client applications executed on user terminals participating in the conference call being arranged to communicate device identification information of the user terminal on which it is executed to the server 103.

Each communication client application may be configured to output e.g. a sinusoidal waveform at a certain frequency (e.g. ringtone) to alert the user associated with the user terminal on which the communication client application of an incoming call. In yet another example, a communication client application can detect that the user terminal on which it is executed is co-located with another user terminal participating in the conference call based on performing signal processing on the audio signal output from the microphone of the user terminal to detect the presence of the sinusoidal waveform in the audio signal output from the microphone. Similar principles apply when the echo removal system 500 is implemented as part of the functionality of the server 103 based on each of the communication client applications executed on user terminals participating in the conference call being arranged to communicate the detected presence of the sinusoidal waveform to the server 103.

It will be appreciated that other methods apparent to persons skilled in the art may be used in detecting the presence of two more user terminals participating in the conference call in the same acoustic space, and embodiments of the present disclosure extend to these other methods.

By deactivating the echo removal system 500, the operations described above with reference to the delay module 502 and the echo cancellation module 506 are not performed. This reduces processing requirements of the device on which the echo removal system 500 is implemented (e.g. a user terminal or server 103). This is particularly advantageous when the echo removal system 500 is implemented on a mobile device as part of the functionality of the communication client application executed on CPU 202 of the mobile device, where it is important to keep the power consumption of the mobile device at a low level because, for example, the power supply to the mobile device may be limited.

As described above, according to an aspect of the present disclosure there is provided a method implemented during a communication event conducted between a user device and at least one further user device over a communications network, the method comprising: receiving an audio signal that is to be output from a speaker of said user device, said audio signal comprising at least one microphone signal transmitted from one or more of the at least one further user device; detecting that said audio signal comprises at least one audio component of a microphone signal transmitted from one of said at least one further user device that is co-located with said user device; and based on this detection, removing said at least one audio component from said audio signal to produce an output audio signal for output from said speaker.

The method may further comprise: receiving a microphone signal from said user device; computing a delay based on said audio signal and the delayed microphone signal; and delaying the microphone signal by said computed delay to provide a delayed microphone signal, wherein said detection is based on said audio signal and the delayed microphone signal.

The step of computing the delay may comprise comparing said audio signal and the delayed microphone signal at a plurality of different delays and selecting the delay which provides the highest correlation between said audio signal and the delayed microphone signal The detecting step may comprise monitoring a degree of cross correlation between said audio signal and the delayed microphone signal.

The detecting step may comprise modelling an echo path of signal components in the microphone signal using an adaptive model based on the delayed microphone signal to determine an adaptive model estimate of echo in the received audio signal; and comparing the adaptive model estimate of echo in the received audio signal with said received audio signal.

In exemplary embodiments the audio signal is received at said user device over the communications network.

In exemplary embodiments the method is performed by a communication client application executed on said user device.

In other exemplary embodiments the user device and the at least one further user device communicate over the communications network via a network entity during said communication event, and the method is performed by said network entity.

In these other exemplary embodiments the method may further comprise: receiving a microphone signal from said user device; receiving a microphone signal from said at least one further user device; computing a delay based on the microphone signal received from said user device and the microphone signal from said at least one further user device; and delaying the microphone signal received from said user device by said computed delay to provide a delayed microphone signal, wherein said detection is based on said audio signal and the delayed microphone signal.

The step of computing the delay may comprise comparing the microphone signal received from said user device and the microphone signal from said at least one further user device at a plurality of different delays and selecting the delay which provides the highest correlation between said microphone signals.

The detecting step may comprise: modelling a propagation path between an audio source and the network entity via said at least one further user device, and an inverse of a propagation path between the audio source and the network entity via said user device using an adaptive model based on the delayed microphone signal to determine an adaptive model estimate of echo in the microphone signal received from said at least one further user device; and comparing the adaptive model estimate of echo in the microphone signal received from said at least one further user device with said received audio signal.

The network entity may comprise a mixer configured to receive the microphone signal from said user device and the microphone signal from said at least one further user device over the communications network, and said audio signal is output from said mixer for delivery to said user device, The method may further comprise encoding the output audio signal at an encoder of said network entity to produce an encoded output audio signal and transmitting the encoded output audio signal over the communications network to said user device.

In exemplary embodiments the method is performed based on detecting that the user device and the at least one further user device are located in a common acoustic space.

The communication event may be one of a voice call and a video call.

The communications network may be a packet-based network. The packet-based network may comprise the Internet.

According to an aspect of the present disclosure there is provided a computer program being embodied on a computer-readable medium and configured so as when executed on a processor to perform any of the method steps described herein.

The steps shown separately in FIG. 6 may or may not be implemented as separate steps.

Generally, any of the functions described herein (e.g. the functional modules shown in FIGS. 5a and 5b and the functional steps shown in FIG. 6) can be implemented using software, firmware, hardware (e.g., fixed logic circuitry), or a combination of these implementations. For example in the server implementation, the functionality may be implemented by an echo removal module which may be implemented software, firmware, hardware (e.g., fixed logic circuitry), or a combination of these implementations.

The modules and steps shown separately in FIGS. 5a, 5b and 6 may or may not be implemented as separate modules or steps. For example, the echo cancellation module 506 may perform the functions of the delay module 502.

The terms "controller", "functionality", "component", "module" and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented during a communication event conducted between a first user device, a second user device, and a third user device over a communications network, the method comprising:
   receiving, at a server from the first user device, an audio signal comprising at least one microphone signal transmitted from one or more of the second user device and the third user device;
   detecting, at the server, that the second user device is co-located with the first user device, the audio signal comprising at least one audio component of a microphone signal transmitted from the second user device;
   responsive to the detection by the server that the second user device is co-located with the first user device, selectively activating echo removal functionality for the at least one audio component of the microphone signal transmitted from the second user device to perform echo cancellation at the server for the first user device and the second user device, and without performing echo cancellation for the third user device that is not co-located with the first user device; and
   producing, by the server, an output audio signal including the at least one component of the microphone signal with the echo cancellation performed, and transmitting the output audio signal to the first user device for output from a speaker of the first user device.

2. The method of claim 1, further comprising:
   receiving a microphone signal from first user device;
   computing a delay based on said audio signal and the microphone signal; and
   delaying the microphone signal by said computed delay to provide a delayed microphone signal, wherein said detection is based on said audio signal and the delayed microphone signal.

3. The method of claim 2, wherein computing the delay comprises comparing said audio signal and the microphone signal at a plurality of different delays and selecting the delay which provides the highest correlation between said audio signal and the microphone signal.

4. The method of claim 2, wherein said detecting comprises monitoring a degree of cross correlation between said audio signal and the microphone signal.

5. The method of claim 2, wherein said detecting comprises:
   modelling an echo path of signal components in the microphone signal using an adaptive model based on the microphone signal to determine an adaptive estimate of echo in the received audio signal; and
   comparing the adaptive estimate of echo in the received audio signal with said received audio signal.

6. The method of claim 1, wherein the audio signal is received at the server over the communications network.

7. The method of claim 1, wherein the method is performed by a system executed on the server.

8. The method of claim 1, wherein the first user device and at least one of the second and third user devices communicate over the communications network via the server during said communication event, and the method is performed by the server.

9. The method of claim 8, further comprising:
receiving a microphone signal from the first user device;
receiving an additional microphone signal from at least one of the the second and third user devices;
computing a delay based on the microphone signal received from the first user device and the additional microphone signal; and
delaying the microphone signal received from the first user device by said computed delay to provide a delayed microphone signal, wherein said detection is based on said audio signal and the delayed microphone signal.

10. The method of claim 9, wherein computing the delay comprises comparing the microphone signal received from the first user device and the additional microphone signal at a plurality of different delays and selecting the delay which provides the highest correlation between the microphone signal received from the first user device and the additional microphone signal.

11. The method of claim 9, wherein the server comprises a mixer configured to receive the microphone signal from the first user device and the microphone signal from the at least one of the second or third user devices over the communications network, and said audio signal is output from said mixer for delivery to the first user device.

12. The method of claim 8, wherein said detecting comprises:
modelling a propagation path between an audio source and the server via the second user device that is co-located with the first user device, and modelling an inverse of a propagation path between the audio source and the server via the first user device using an adaptive model based on the delayed microphone signal to determine an adaptive estimate of echo in the microphone signal received from at least one of the second or third user devices; and
comparing the adaptive estimate of echo in the microphone signal received from the at least one of the second or third user devices with said received audio signal.

13. The method of claim 8, further comprising:
encoding the output audio signal at an encoder of the server to produce an encoded output audio signal; and
transmitting the encoded output audio signal over the communications network to the first user device.

14. The method of claim 1, wherein the method is performed based on detecting that the first user device and the second user device that is co-located with the first user device are located in a common acoustic space.

15. The method of claim 1, wherein the communication event is one of a voice call and a video call.

16. The method of claim 1, wherein the communications network is a packet-based network.

17. The method of claim 16, wherein said packet-based network comprises the Internet.

18. A first user device comprising:
a network interface configured to transmit and receive audio between the first user device and a second user device over a communication network during a communication event, and transmit and receive audio between the first user device and a third user device over the communication network during the communication event;
a microphone for receiving audio signals;
a speaker; and
one or more processors configured to run a client application, wherein the client application is configured to:
receive an indication that the first user device and the second user device are co-located;
receive, at the first user device from at least one of the second user device and the third user device, an audio signal, said audio signal comprising at least one microphone signal; and
based on the indication that the first user device and the second user device are co-located, performing echo cancellation and delay computation for signals from the second user device that is co-located with the first user device, and not performing echo cancellation and delay computation for signals from the third user device that is not co-located with the first user device.

19. A first user device as recited in claim 18, wherein the received indication that the first user device and the second user device are co-located is based on receiving a manual notification by a user, determining the location of the first user device and the second user device using geographic location technology, or determining that an access point identifier used by the first user device matches an access point identifier used by the second user device.

20. A network entity comprising:
a network interface configured to transmit and receive audio between a first user device, a second user device, and a third user device over a communication network during a communication event; and
an echo removal module configured to:
receive, at a server from the first user device, an audio signal, said audio signal comprising at least one microphone signal transmitted from the second user device;
detect, by the server, that the second user device is co-located with the first user device, the audio signal comprising an audio component of a microphone signal transmitted from the second user device;
responsive to the detection by the server that the second user device is co-located with the first user device, activating echo removal including activating delay estimation and echo cancellation at the server for the second user device that is co-located with the first user device, and without performing echo cancellation on the third user device that is not co-located with the first user device and the second user device; and
producing, by the server, an output audio signal including the at least one component of the microphone signal with the echo cancellation performed, and transmitting the output audio signal to the first user device for output from a speaker of the first user device.

* * * * *